April 23, 1963     H. L. CLARK     3,087,062
100 INCH RADIOMETER
Filed May 13, 1960
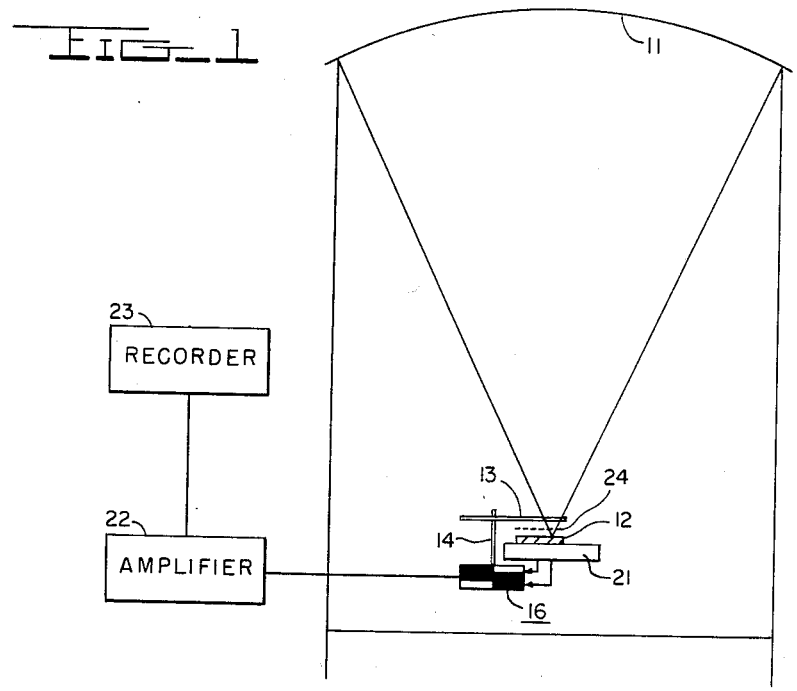
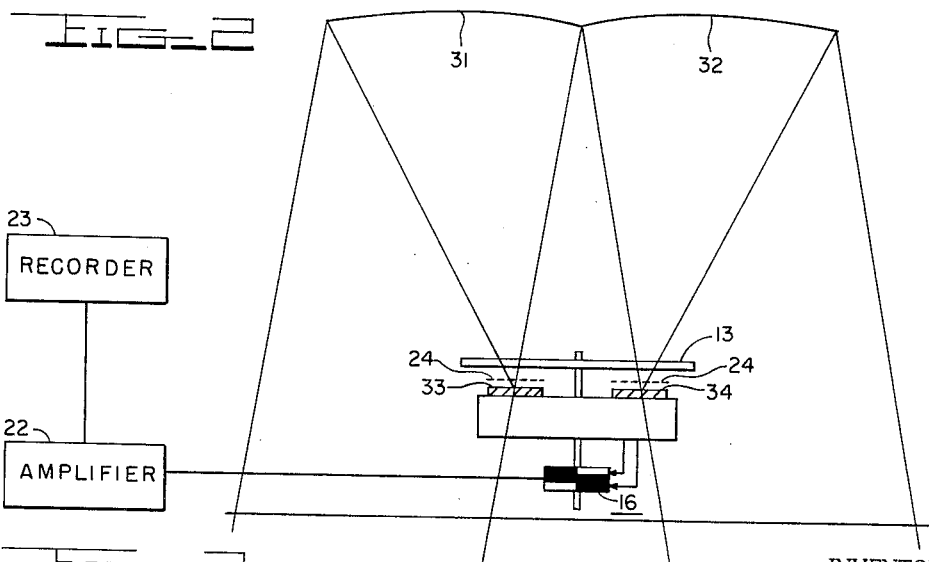
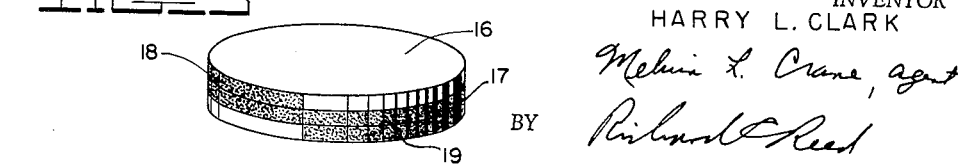
INVENTOR
HARRY L. CLARK
BY
ATTORNEY United States Patent Office 3,087,062
Patented Apr. 23, 1963

3,087,062
100 INCH RADIOMETER
Harry L. Clark, 5101 Spring Drive SE., Temple Hills, Md.
Filed May 13, 1960, Ser. No. 29,120
11 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

The present invention is directed to radiometers and more particularly to a radiometer for measuring and recording very small thermal power radiation in the infrared region.

All objects above a temperature of absolute zero emit radiation, the spectral distribution of which depends upon their temperature. The sea is essentially a "black body" or perfect radiator with maximum output in the wavelength region between about 10 and 12 microns, depending upon the temperature of the sea. This region of maximum output of the sea is spanned by about an 8 to 13 micron window in the atmosphere, so that under average conditions about 30 percent of this radiation is transmitted. Liquid water is a strong absorber of 8–13 micron radiation and also complete absorption takes place in a surface thickness of about 0.1 millimeter such that only the radiation from this very thin surface layer is observable from above the surface. Any instrumentation observing this surface layer will also view a small portion of thermal radiation above this layer which originates in the sky above and is reflected by the sea.

The radiometer of the present invention will be explained as being used specifically in the investigation of radiometric properties of the sea and their relationship to sea state. It has been determined that man-made oil slicks alter the wave structure sufficiently to provide an effective change in the reflecting surface on the sea and thus causes the oil slicks to appear colder than the surrounding water. Daytime cloud cover also blocks solar radiation to produce colder areas whereas night time clouds blocks the radiation from the seat to produce hotter areas. Other differences in temperature are brought about by "cat's-paws," ocean currents, river flow into the sea, and the Gulf Stream. Thus, it is seen that the temperature of the sea can be affected by many varying circumstances and the nearby areas can have different temperatures.

It is therefore an object of the present invention to provide a system for measuring slight temperature differences.

Another object is to provide an infrared detection system which is very sensitive and adapted to operate over a wavelength region of about 8–13 microns.

Still another object is to measure and record thermal power radiated by an object.

While another object is to provide a system which operates with very little noise level in the output due to outside interference.

Yet another object is to provide a detection system which measures and records temperature differences over a broad area.

Another object is to provide a system for collecting heat radiation and converting the heat radiation into an electrical signal.

Other objects and advantages of the present invention will hereinafter become more fully apparent from the following description of the annexed drawings which illustrates the preferred embodiments, and wherein;

FIG. 1 illustrates a schematic drawing of a system in accordance to the present invention;

FIG. 2 illustrates a schematic drawing of a modification of the system shown by illustration in FIG. 1; and FIG. 3 is an illustration of a commutator element used with the device of FIG. 1.

The invention is broadly directed to a radiometer comprising a mirrored surface which collects thermal radiation from an object and reflects or focuses the radiation onto a radiation sensitive thermopile. Before reaching the thermopile, the radiation is chopped mechanically at about 5-c.p.s. by a "butterfly" shutter and upon reaching the thermopile, the radiation is converted to an electrical voltage. The electrical voltage is amplified and synchronously rectified by a segmented commutator mounted on the shaft of the shutter, and rotated therewith. The rectified electrical voltage is suitably amplified and filtered electronically and then recorded by any suitable means. Such a system will measure the absolute magnitude of the thermal power radiated by the sea or any other thermal body.

Now referring to the drawings wherein the same reference characters refer to like parts throughout the drawing there is shown by illustration in FIG. 1 a schematic diagram of a radiometer made in accordance to the present invention. The radiometer includes a 100 inch diameter first-surface parabolic mirror 11 having a focal length of 70 inches which may be constructed of any suitable material, for instance, an alloy, Haynes 25, with the front surface highly polished for reflecting incident radiation. Incident radiation is reflected toward the focal point where a radiation thermopile 12 is located to receive the reflected radiation. The thermopile is made of a sufficient number of radiation sensitive elements such as bismuth silver to provide an electrical output corresponding to the incident radiation. Before reaching the thermopile 12, the radiation is mechanically chopped by a "butterfly" shutter 13 in the form of a two bladded propeller which is secured to a shaft 14 and rotated at about 5-c.p.s. by any suitable means. The shaft also has a segmental commutator 16 secured thereto which is rotated simultaneously with the shutter 13 and shown in FIG. 3. The segmented commutator is formed by a disk which has a center contact surface 17 completely surrounding the disk with semicircular contact portions 18 and 19 on each side of the center contact surface integral therewith and positioned along separate semicircular portions of the center contact. An electrical signal generated by the thermopile is directed from the thermopile through a suitable amplifier 21 where the signals are suitably amplified and fed to the semi-circular electrical contact strips on the commutator 16. The signals are synchronously rectified and the rectified signals are taken from the commutator by a suitable contact means making contact with the center contact strip 17 surrounding the disk. The synchronous rectified signals are directed to a suitable amplifier 22 where the signals are suitably amplified and passed on to a recorder 23 where the signals are recorded.

The thermopile itself is non-selective therefore a radiation frequency filter window 24 must be used to insure operation in the correct wavelength range. It has been determined that a silver chloride window coated with silver sulfide operates in the correct frequency range and provides a suitable radiation filter for the thermopile.

In operation of the radiometer to record radiation of the sea, the components of the device are arranged in a suitable holder such that the mirror is positioned directly above the other elements such that the mirror will receive radiation from the sea. The radiation is collected by the mirrored surface and focused onto the thermopile. The radiation from the mirror to the thermopile is chopped mechanically by the "butterfly" shutter at about 5-c.p.s., thus the radiation strikes the thermopile only when either of the shutter blades are not passing through the radiation path. The radiation striking the thermopile produces an electrical voltage, sinusoidal output which is fed to the amplifier and amplified. The output of the amplifier is synchronously rectified by the segmented commutator mounted on the shaft upon which the shutter is mounted. The rectified voltage from the commutator is fed to a second amplifier where the output is again amplified. The output from the last amplifier is then fed to the recorder where the resultant of the output voltage is recorded.

A modification of the device of FIG. 1 is illustrated in FIG. 2 wherein the mirror is split along a diameter and the two halves are opened outwardly about 15 degrees thereby forming two independent collecting areas 31 and 32. Each of the collecting areas reflects the received thermal radiation to a focus onto separate radiation thermopiles 33 and 34 which accepts radiation from their respective mirror sections. The radiation thermopiles are electrically connected such that their outputs oppose each other and produce a resultant signal which is the difference of the two voltages produced by each of the thermopiles. The net resultant of the two outputs are then fed to an amplifier where the signal is then amplified and the output thereof is fed to a split commutator which synchronously rectifies the resultant signal which is amplified by amplifier 22 and then recorded the same as explained above in the operation for the device illustrated in FIG. 1. With the differential arrangement, very small changes in power radiated from the sea can be measured.

The performance of the device having the single thermopile is affected slightly by inhomogeneities in the atmosphere, small changes in altitude and the roll and pitch of the aircraft. These effects are slight and are even less when using the device with a double thermopile. It has been determined that changes in radiant intensity equivalent to 500 micro-degrees can be observed with a possible error of about 5 percent.

It is possible to mount the radiometer such that it has a nutational motion rather than being secured in a stationary manner. With a nutational motion a greater area can be looked at in a sweep across the area. Thus greater areas can be observed for thermal radiation differences.

The device has been described for use in detecting the thermal radiation of the sea however it is possible to detect radiation from other sources by use of the same type of system wherein the mirror will look in the direction of the radiation to be detected.

Obviously many modifications and variations of the present invention are possible in the light of the above teachings. It is therefore to be understood that within the scope of the appended claims the invention may be practical otherwise than as specifically described.

What is claimed is:

1. A thermal radiation detector which comprises at least one radiation sensitive means that produces a voltage output proportional to incident radiation, a radiation collector means positioned to receive radiation from a source and to focus said radiation onto said radiation sensitive means, radiation chopper means positioned between said radiation collector and said radiation sensitive means and rotatable to periodically interrupt said radiation focused onto said radiation sensitive means, a commutator means adapted to be rotated with said radiation chopper means, amplifying means adapted to receive and amplify said voltage output of said radiation sensitive means, the output signal of said amplifying means being fed to said commutator means, said commutator means rectifying said signal which is then amplified and fed to a recorder means.

2. A thermal radiation detector which comprises, at least one radiation sensitive means that produces an output voltage according to incident radiation, a radiation collector means adapted to receive and focus radiation onto said radiation sensitive means, a radiation chopper means positioned between said radiation collector means and said radiation sensitive means and rotatable at a low frequency to periodically interrupt said radiation focused onto said radiation sensitive means, a commutator means adapted to be rotated simultaneously with said radiation chopper means, voltage amplifying means adapted to receive and amplify said voltage output of said radiation sensitive means, the output signal of said amplifying means being fed to said commutator means, said commutator means rectifying said signal which is then amplified and fed to a recorder means.

3. A thermal radiation detector as claimed in claim 2 wherein the detector comprises only one radiation sensitive means.

4. A thermal radiation detector as claimed in claim 2 wherein the detector comprises two separate radiation sensitive means.

5. A thermal radiation detector as claimed in claim 4 wherein said radiation collector means comprises angularly disposes surfaces.

6. A thermal radiation detector which comprises at least one radiation sensitive thermopile that produces a voltage output in accordance to incident radiation, a radiation collector positioned to receive radiation from a source and to focus said radiation onto said radiation sensitive thermopile, a radiation chopper positioned between said radiation collector and said radiation sensitive thermopile and rotatable to periodically interrupt said radiation focused onto said radiation sensitive thermopile, a commutator adapted to be rotated with said radiation chopper, an amplifier adapted to receive said voltage output of said radiation sensitive thermopile the output of said amplifier being fed to said commutator, said commutator rectifying said output signal which is fed to a second amplifier, said second amplifier amplifying said output signal and feeding said rectified and amplified signal to a recorder.

7. A radiometer for detecting and recording thermal radiation in the infrared region which comprises at least one radiation sensitive thermopile adapted to produce a voltage output in accordance to incident radiation, a radiation reflective surface for focusing incident radiation onto said radiation sensitive surface, a drive shaft, a radiation chopper secured at one end of said drive shaft and rotatable therewith to periodically interrupt said radiation focused onto said radiation sensitive thermopile, a split commutator secured to said drive shaft and simultaneously rotatable therewith in relationship with said radiation chopper, an amplifier adapted to receive said voltage output produced by said radiation sensitive thermopile, the output signal of said amplifier adapted to be fed to said commutator, said commutator adapted to rectify said signal and to feed said rectified signal to a second amplifier, and said second amplifier adapted to amplify said signal and to feed said signal to a recorder, said recorder recording said signal in accordance to radiation received by said reflective surface from an object.

8. A radiometer as claimed in claim 7 which comprises only one radiation sensitive thermopile.

9. A radiometer as claimed in claim 7 which comprises two radiation sensitive thermopiles.

10. A radiometer as claimed in claim 9 in which said radiation sensitive thermopiles are connected electrically with their outputs opposing each other.

11. A radiometer as claimed in claim 10 wherein said reflective surface is divided into angularly disposed sections.

References Cited in the file of this patent

UNITED STATES PATENTS 2,114,298    Gunn _____ Apr. 19, 1938

(Other references on following page)

UNITED STATES PATENTS

| | | |
|---|---|---|
| 2,237,193 | Mobsby | Apr. 1, 1941 |
| 2,392,873 | Zahl | Jan. 15, 1946 |
| 2,422,971 | Kell et al. | June 24, 1947 |
| 2,434,957 | Quarles | Jan. 27, 1948 |
| 2,442,298 | Liston | May 25, 1948 |
| 2,517,702 | Offner | Aug. 8, 1950 |
| 2,826,703 | Bemis et al. | Mar. 11, 1958 |
| 2,838,678 | Beese | June 10, 1958 |
| 2,953,529 | Schultz | Sept. 20, 1960 |
| 2,993,121 | Esher | July 18, 1961 |
| 3,026,413 | Taylor | Mar. 20, 1962 |